April 27, 1965     CARL-ERIK GRANQVIST     3,181,072

ARRANGEMENT FOR TRANSMITTING A MEASURED QUANTITY

Filed Sept. 11, 1961     3 Sheets-Sheet 1

INVENTOR
CARL-ERIK GRANQVIST

BY *Lawson and Taylor*
ATTORNEYS

April 27, 1965   CARL-ERIK GRANQVIST   3,181,072
ARRANGEMENT FOR TRANSMITTING A MEASURED QUANTITY
Filed Sept. 11, 1961   3 Sheets-Sheet 2

INVENTOR
CARL-ERIK GRANQVIST
BY
ATTORNEYS

April 27, 1965 CARL-ERIK GRANQVIST 3,181,072
ARRANGEMENT FOR TRANSMITTING A MEASURED QUANTITY
Filed Sept. 11, 1961 3 Sheets-Sheet 3

INVENTOR
CARL-ERIK GRANQVIST

BY
ATTORNEYS

United States Patent Office 3,181,072
Patented Apr. 27, 1965

3,181,072
ARRANGEMENT FOR TRANSMITTING A MEASURED QUANTITY
Carl-Erik Granqvist, Lidingo, Sweden, assignor to Svenska Aktiebolaget Gasaccumulator, Lidingo, Sweden, a corporation of Sweden
Filed Sept. 11, 1961, Ser. No. 137,428
Claims priority, application Sweden, Sept. 20, 1960, 8,941/60
6 Claims. (Cl. 328—133)

For the purpose of remote transmission of an electrical or mechanical quantity it is known to generate pulses of which the number, frequency or the like represent the quantity. It is known, for instance, to utilize a photo tube with a rotating perforated disc in which the number of perforations that have passed in rotating to a certain position represents the quantity in question. It has also been proposed to use a collector condenser with a large number of bars. For transmitting electrical quantities it is possible to apply the principle of letting the number of pulses that is required for charging a condenser to a certain voltage represent the quantity.

Figure 1:
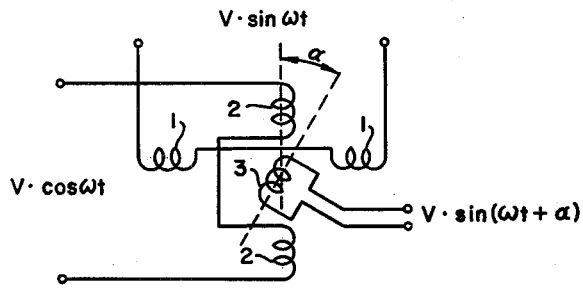
Figure 2:
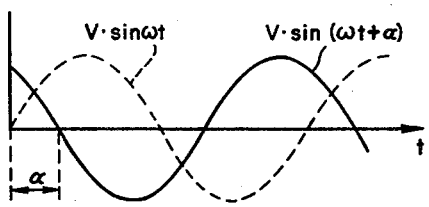

Furthermore, it is known that an angular position may be determined by measuring the phase angle between the voltage of a movable coil in a rotating field and the phase angle of the rotating field. On the annexed drawing, FIG. 1 shows diagrammatically the customary form of such an arrangement. The arrangement comprises in known manner two mutually perpendicular pairs of coils 1 and 2, to which are fed alternating voltages $V \cdot \sin \omega t$ and $V \cdot \cos \omega t$, respectively. The movable coil 3 is assumed to be in the position $\alpha$ relative to the coils 2. There is then induced in the movable coil a voltage of the value $V \cdot \sin \omega t \cdot \cos \alpha + V \cdot \cos \omega t \cdot \sin \alpha = V \cdot \sin (\omega t + \alpha)$. It is apparent from this that the voltage of coil 3 has a phase displacement which is proportional to the position angle $\alpha$. This has been illustrated in FIG. 2, which shows the reference voltage $V \cdot \sin \omega t$ and the phase-displaced voltage $V \cdot \sin (\omega t + \alpha)$.

With the aid of known electrical circuits, pulses may be generated in a comparatively simple manner in coincidence with the zeros of the voltages of alternating waveform, and these pulses may be made to actuate a flip-flop which in its turn is actuated via an electrical gate to let through a number of pulses from a pulse generator. The number of pulses will then be proportional to the position angle $\alpha$. If, in an arrangement of this type, a high resolution is desired in the indication of the position angle $\alpha$, the pulse frequency must be large relative to the sampling rate $\omega$. For instance, if a resolution is desired of 1 in 180° and sampling occurs at 400 p./s., a pulse frequency of about 80,000 pulses per second is required. These high frequencies are very difficult to handle since a large bandwidth is required. It may also be a requirement that the members generating the movable field as well as the sampling coil must be constructed of small dimensions, for instance, if only small forces are available for turning the coil. This is the case when telemetering measurements from barometer units, by bimetallic strips, electrical moving-coil instruments, etc. If sampling rates of the order of $10^4$ are used in such cases, it may be practically impossible to construct an arrangement having high resolution.

The present invention, which results in a simple arrangement, is based on a modulation procedure by which the number of pulses corresponding to the measured quantity is obtained directly with the aid of a coincidence device. The invention provides an arrangement in which a voltage of predetermined pulse frequency is adapted to be modulated with at least two mutually phase-displaced sampling frequencies. These frequencies may form a rotating or oscillating field.

Figure 3:
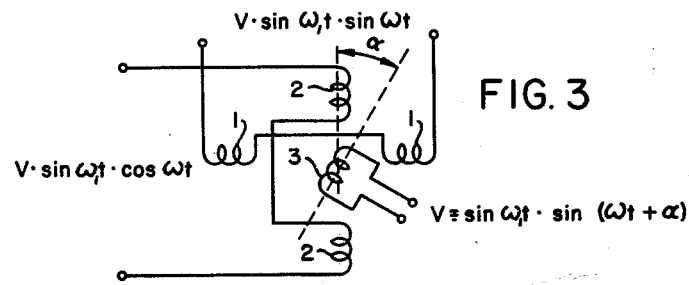
Figure 4:
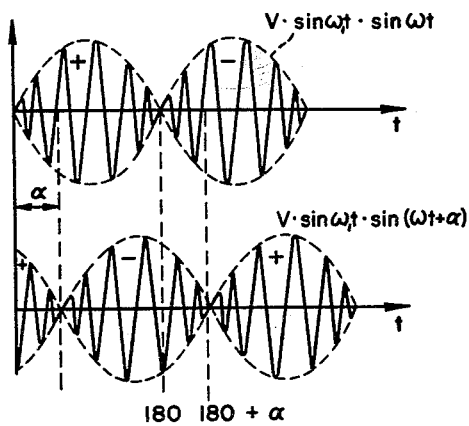
Figure 5:
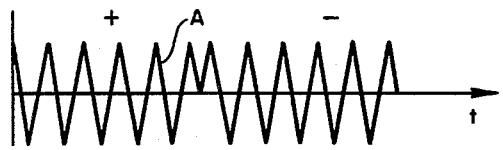
Figure 5:
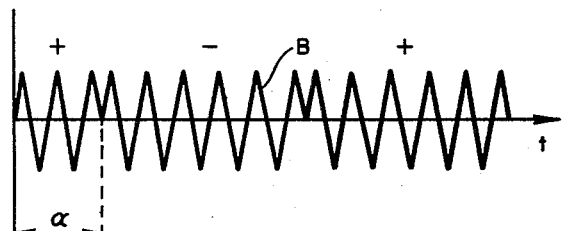
Figure 6:
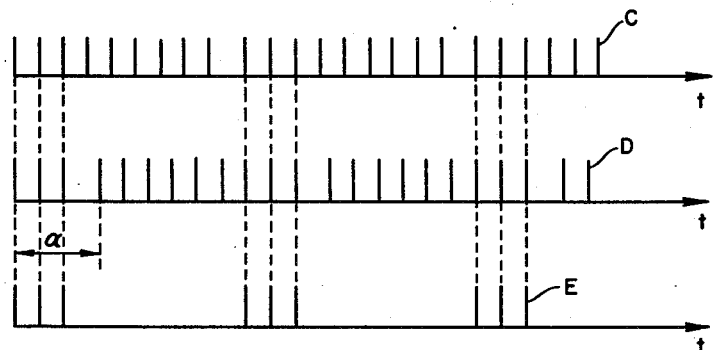

On the attached drawings, FIGS. 3 and 7 to 12 show various embodiments of an arrangement according to the invention, whereas FIGS. 4 to 6 represent a diagram to explain the operation of the arrangement.

In the FIG. 3 arrangement, a rotating field is generated by a high frequency voltage which is modulated with $\sin \omega t$ and $\cos \cdot \omega t$, respectively. The FIG. 3 arrangement is constructed in the same manner as that of FIG. 1, i.e. with mutually perpendicular coil assemblies 1 and 2 and a rotatable sampling coil 3. However, as is apparent from the figure the mutually perpendicular coils have voltages $V \cdot \sin \omega_1 t \cdot \sin \omega t$ and $V \cdot \sin \omega_1 t \cdot \cos \omega t$, respectively, applied to them. In analogy with the above, the result is that a voltage $V \cdot \sin \omega_1 t \cdot \sin (\omega t + \alpha)$ is induced in the sampling coil 3.

FIG. 4 shows the curves of the voltage $V \cdot \sin \omega_1 t \cdot \sin \omega t$ applied to the coils 1 and the voltage $V \cdot \sin \omega_1 t \cdot \sin (\omega t + \alpha)$ taken from the sampling coil 3. The diagram shows that the phase of the reference voltage, which term refers to the voltage applied to the coils 1, is positive during the first half-period of the reference voltage, but is negative during the second half-period. The voltage obtained from the sampling coil 3 is however positive only during a time corresponding to the angle $\alpha$, after which it is negative from $\alpha$ to $180° + \alpha$. The phase positions of the reference voltage and of the sampling coil output voltage are thus the same during the periods from 0 to $\alpha$ and from $180°$ to $180° + \alpha$. If the two voltages are multiplied in a square-law detector, for instance in a typical watt-meter circuit, a pulse train is obtained, of which the duration becomes equal to $\alpha$ twice during a period. The voltages may also be amplified and limited, resulting in a voltage diagram such as shown in FIG. 5. In this manner, the curve A represents the reference voltage and the curve B the voltage from the coil 3, both voltages having been amplified and limited.

If the voltages are rectified, pulses are obtained in accordance with FIG. 6, in which the pulses C are obtained from the reference voltage, the pulses D from the sampling coil and, finally, the pulses E can be obtained during coincidence of the pulses C and D. Such coincidence occurs on the one hand during the time $\alpha$ and on the other hand during the time from $180°$ to $180° + \alpha$. The number of pulses then corresponds to the angle.

Owing to the fact that the circuits for generating the rotating field have applied to them a high frequency voltage which is modulated in the manner indicated, these circuits can be proportioned for the high frequency voltage, $\omega_1$, which is also the frequency of the pulses. The modulation frequency $\omega$ may then have an arbitrarily low value. For instance, the high frequency may be 10 kc. and the modulation frequency may correspond to a sampling rate of for instance two revolutions per second.

Figure 7:
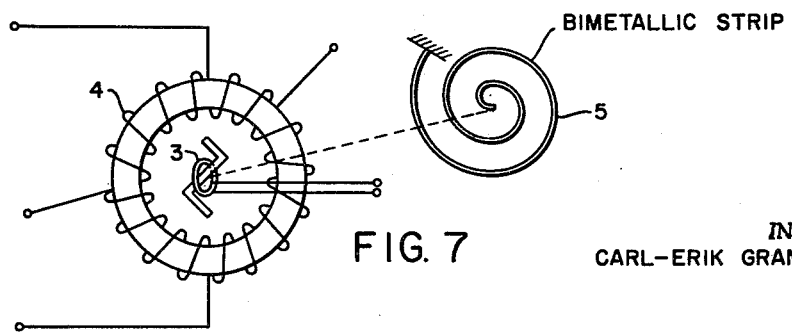

In a practical embodiment of the arrangement according to the invention, the rotating field according to FIG. 7 may be generated with the aid of a toroidal winding 4 and the sampling coil 3 may be fixed and surround a rotating Z-armature. A Z-armature of this type may be made of very low weight and is suitable for being controlled by an instrument such as a bimetallic strip 5, as indicated in FIG. 7. The fixed arrangement of the sampling coil 3 makes it possible to avoid sliding contacts etc.

Figure 8:
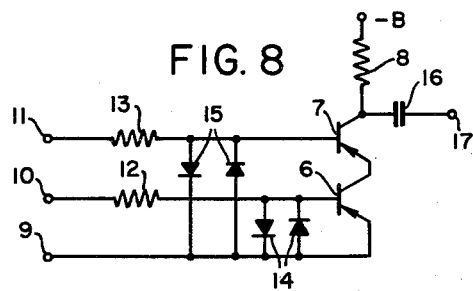

FIG. 8 shows an embodiment of a circuit arrangement for the pulse detector proper. It comprises two transistors 6 and 7 in series arrangement, the collector of one transistor being connected directly to the emitter of the other. The negative terminal $-B$ of a voltage source is connected via a resistor 8 to the collector of transistor 7 and the positive terminal of the source is assumed to be connected to the emitter of transistor 6. The sampling coil (FIG. 3) is adapted to be connected to contacts 9 and 10, whereas the reference voltage is applied between connecting terminals 9 and 11. The contact 9 is connected direct to the emitter of transistor 6 and the connecting terminal 10 via a resistor 12 to the base of transistor 6. The connecting terminal 11 is connected through a resistor 13 to the base of transistor 7. Limitation of the applied voltages is provided by mutually opposed diodes 14 and 15 which limit the voltages applied to the terminals 9 and 10 or 10 and 11, respectively.

In the inoperative condition or when a pulse is applied to only one of the pairs of terminals, no current flows through the common collector circuit, since both bases are negative. Only when coincidence occurs, i.e. when pulses are applied simultaneously to the terminals 9 and 10 on the one hand and 9 and 11 on the other hand, is there an output pulse obtained across the condenser 16 for application to the output terminal 17.

For the generation of the required modulating voltages, a rotating goniometer may be used. In principle, an arrangement of the type shown in FIGS. 1 and 3 may be used, in which a high-frequency voltage $V \cdot \sin \omega_1 t$ is applied to the rotating coil and the coil is rotated at a rate corresponding to the angular velocity $\omega$. The goniometer may for instance be as shown in FIG. 7, but the electrical coupling between the rotating and the fixed system is then rather small and it is therefore probably more suitable to use a coil. The use of slip rings for the rotating coil can be avoided through an arrangement comprising a rotating transformer or by mounting the high-frequency generator on the same axle. It is also possible to generate the modulating voltages with the aid of a potentiometer device comprising a circular resistive winding provided with a number of tappings and cooperating with a pair of contact arms which are displaced 180° relative to each other. An arrangement of this type will be described in more detail in connection with FIG. 9, which shows an example of the circuit connection of the various elements that is required for generating pulses representing a measured quantity.

Figure 9:
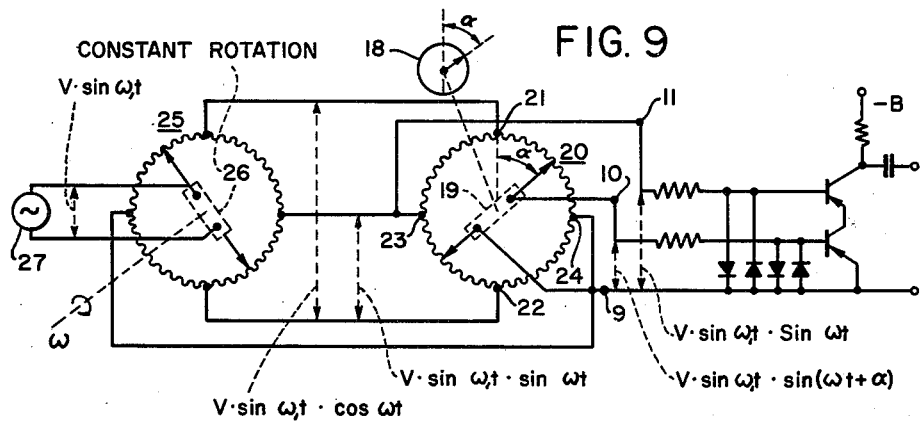

In FIG. 9, the measured quantity to be telemetered may consist of the reading $\alpha$ of a measuring instrument 18. The pointer of the instrument is assumed to be mechanically connected with the movable contact arms 19 of a potentiometer device 20 in such a way that the contact arms 19 are turned through an angle relative to a zero position represented by the tappings 21 and 22 of the potentiometer device 20. To these tappings is applied a voltage $V \cdot \sin \omega_1 t \cdot \cos \omega t$, whereas a voltage $V \cdot \sin \omega_1 t \cdot \sin \omega t$ is supplied to a pair of additional tappings 23 and 24 of the potentiometer device 20.

The voltages referred to are generated in a second, similarly constructed potentiometer device 25, whose contact arms 26 are rotated at a constant rate corresponding to the angular frequency $\omega$ by a motor not shown on the drawing. The contact arms 26 are connected to an alternating current source 27, from which there is obtained a voltage $V \cdot \sin \omega_1 t$. It is apparent that when the contact arms 26 rotate in the manner indicated, there are obtained from the fixed tappings of the potentiometer device 25 the voltages referred to, which are applied to the tappings 21, 22 and 23, 24, respectively of the potentiometer device 20.

As was indicated in connection with the description of FIG. 8, the contact arms 19, which are the equivalent of sampling coil 3 of FIG. 3, are connected to the contacts 9 and 10 of the detector, which is constructed in accordance with FIG. 8. The connecting terminals 9 and 11 are connected to the tappings 23 and 24, so that the voltage $V \cdot \sin \omega_1 t \cdot \sin \omega t$ is applied to these tappings.

It is obvious that the potentiometer devices 20 and 25 shown by way of example in FIG. 9 may be replaced, for instance, with devices in accordance with FIG. 3 or FIG. 7 without altering the principle of the invention. Furthermore, only four-poled systems have been shown by way of example. In these systems, the sampling frequency is equal to the modulating frequency. The systems may however be built with a greater number of poles and through a combination of systems with more poles, a higher degree of accuracy may be attained. The accuracy of the lowest-order system need then only indicate what portion of the full revolution is subject to the operation of the higher-order accurate system. A typical combination of this kind may comprise one four-pole system with an eight-pole system as the higher order etc. It is also possible to use systems of the three-phase type. Instead of the rotating fields hitherto described it is also possible to use oscillating fields, for instance for telemetering displacements. The oscillating fields may be generated in an arrangement having poles placed in a row after each other.

Figure 10:
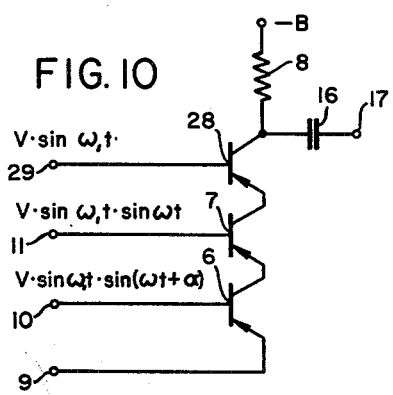

The FIG. 8 and 9 detectors comprise two transistors 6 and 7 and operate so as to make the pulse train repeat twice per revolution. If it is desired for the pulses to occur only once per revolution, this may be attained by arranging for an additional coincidence with the high-frequency voltage. A detector operating in this manner is shown in FIG. 10. The two transistors 6 and 7 are in this case in series with a third transistor 28, so that the collector of transistor 7 is connected direct to the emitter of transistor 28. The base of the latter is connected to a tapping to which is applied the voltage $V \cdot \sin \omega_1 t$. With this arrangement, the reference voltage $V \cdot \sin \omega_1 t \cdot \sin \omega t$ applied to the terminal 11 is modulated so as to reverse its phase for each half-period, whereas the voltage $V \cdot \sin \omega_1 t$ applied to the terminal 29 has a constant phase. Coincidence therefore cannot be obtained for all three transistors during one half-period, the result of which is that pulses representing the angle $\alpha$ are passed only during one half-period. If it is desired for the pulses to pass only during the other half-period, the corresponding change is made in the voltage applied to the terminal 29.

Under certain circumstances it may be desirable that a number of pulses obtained for a certain angle $\alpha$ can be corrected so as to make possible immediate correction of the errors of an instrument in the pulse generator. This may be desirable, for instance, when a bimetallic strip is used to indicate temperature. In this case, the requirement may be for the pulse generator to be corrected so as to yield a certain number of pulses per tenth of a degree. The bimetal causes an angular displacement which is not linear or which does not have the same constant from one specimen to another. A correction of the device can then be made in such a way that there is obtained in spite of this a certain number of pulses per tenth of a degree by introducing a distortion in the distribution of the rotating field.

Figure 11:
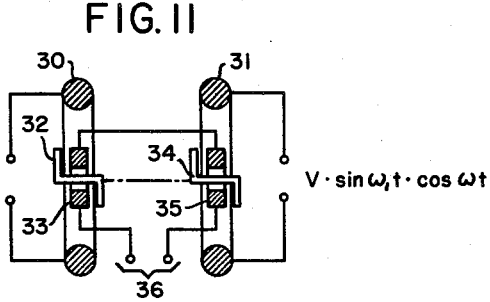
Figure 12:
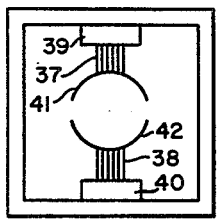

If the rotating field in such a case is generated with the aid of a toroidal winding, the desired distortion of the distribution of the rotating field may be obtained by changing the points at which the voltages are applied or by changing the amplitudes of the voltages, whereby there is obtained instead of a circular rotating field an elliptical one. However, it is to be noted in this connection that when a change is made in the mechanical orientation of the windings a coupling is introduced between the sine and cosine voltages and this coupling may cause complications if there is more than one system being fed from one modulator. These complications may be avoided through the use of two systems, there being provided for instance two Z-armatures, each of which is responsive to one of the components of the high-frequency field. An embodiment of this type is shown in FIG. 11, in which the voltage $V \cdot \sin \omega_1 t \cdot \sin \omega t$ is applied to a toroidal winding 30 and a voltage $V \cdot \sin \omega_1 t \cdot \cos \omega t$ to another winding 31. The first-mentioned winding actuates a Z-armature 32 surrounded by a coil 33 and the second winding 31 actuates a Z-armature surrounded by a coil 35. The coils 33 and 35 are in series with each other and connected to terminals 36, which may be connected to the contacts 9 and 10 in FIG. 8 and FIG. 9.

Instead of generating the fields with the aid of toroidal coils, known components of synchro elements or motors may be used. The pole pieces of the field windings may then be of flexible material or may be provided with screws enabling adjustment of the air gaps, whereby the strength of the field along the circumference may be varied in a desired manner. An arrangement of this type is illustrated diagrammatically in FIG. 12. The two poles 37 and 38 are provided in this arrangement with windings 39 and 40 and with pole pieces 41 and 42. The free ends of these pole pieces are constructed so as to be flexible and deformable in the radial direction, whereby a desired variation of the distribution of the field may be obtained.

The arrangement herein described may also be used for changing the pulse frequency of a sequence of pulses. For instance, if the rotatable member is in a position corresponding to $\alpha = 90°$, coincidence is obtained for each pulse and the entire sequence of pulses is passed by the system. If the rotatable member is turned through a small angle, the number of pulses of each terminating interval decreases in dependence upon the angle of rotation. In this manner, a change of pulse frequency may be obtained, if during the intervals determined by the sampling frequency only a certain portion of the incoming pulses is let through.

The quantity to be telemetered by the arrangements herein described may represent temperature, barometric pressure, wind speed, humidity, etc. and the arrangements may furthermore be utilized in power generating equipment, beacon installations, radio stations and so on. It may then be suitable to let the voltages of the rotating fields feed a large number of transmitters. In the FIG. 9 embodiment, for instance, this would mean that the fixed tappings of the potentiometer device 25 would be connected to and feed a number of potentiometer devices corresponding to the device 20.

It is assumed in the foregoing description of the invention for simplicity that the occurring alternating voltages are sinusoidal. However, other shapes of voltage curves are possible and under certain circumstances it may be more suitable for the alternating voltage to be of pure pulse form. In that case, the generator 27 of FIG. 9 would for instance be adapted to emit pulses of a frequency corresponding to the angular frequency $\omega_1$.

Further modifications are possible within the scope of the claims.

What I claim is:

1. An arrangement for generating pulse sequences, in which the number of pulses of each sequence represents a measured quantity, comprising means for generating a pair of mutually phase-displaced modulated high frequency oscillations, a transmitter having mutually displaced field producing members such as coils, said high frequency oscillations being applied to said field producing members for producing a rotating or oscillating field, a sampling member movable with respect to said field producing members, the position of said sampling member in said field being representative of the measured quantity for generating by said sampling member a modulated high frequency oscillation with a phase-displacement relative to one of said mutually phase-displaced high frequency oscillations which is representative to the measured quantity, a detector having two input terminals, means for applying one of said high frequency oscillations to one of said input terminals and for applying the high frequency oscillation from said sampling member to the other one of said input terminals, said detector generating a pulse in response to each period of the high frequency oscillation applied to one input terminal with one polarity, which is coincident with a period of the same polarity of the high frequency oscillation applied to the other input terminal.

2. An arrangement as claimed in claim 1, in which said field producing members form a bridge circuit, the pair of mutually phase-displaced high frequency oscillations being applied to the diagonals of said bridge circuit.

3. An arrangement as claimed in claim 1, in which the detector is provided with a third input terminal, to which the unmodulated high frequency oscillation is applied for suppressing the generation of pulses by the detector during every second half period of the modulating oscillation.

4. An arrangement as claimed in claim 1, in which said field producing members are disposed along a circumference for producing a number of poles along said circumference, a greater number of poles corresponding to the generation of a greater number of pulses for a predetermined movement of the sampling member with respect to the field.

5. An arrangement as claimed in claim 1, in which said sampling member is formed by a rotatable Z-armature surrounded by a fixed coil coupled to said field producing members for inducing in said fixed coil a high frequency oscillation with a phase-displacement corresponding to the position of said armature.

6. An arrangement as claimed in claim 1, in which the field producing members are provided with field adjusting means for adjusting the configuration of the field around the circumference of said sampling member.

References Cited by the Examiner

UNITED STATES PATENTS 3,034,053  5/62  Lanning et al. _____ 328—133

ARTHUR GAUSS, *Primary Examiner.*

JOHN W. HUCKERT, *Examiner.*